United States Patent
Pitt et al.

(10) Patent No.: US 9,344,993 B2
(45) Date of Patent: May 17, 2016

(54) LOCATION VERIFICATION

(71) Applicants: Lance D. Pitt, Kent, WA (US); Gordon John Hines, Kirkland, WA (US)

(72) Inventors: Lance D. Pitt, Kent, WA (US); Gordon John Hines, Kirkland, WA (US)

(73) Assignee: Telecommunication Systems, Inc., Annapolis, MD (US)

( * ) Notice: Subject to any disclaimer, the term of this patent is extended or adjusted under 35 U.S.C. 154(b) by 0 days.

(21) Appl. No.: 14/507,322

(22) Filed: Oct. 6, 2014

(65) Prior Publication Data

US 2015/0282115 A1 Oct. 1, 2015

Related U.S. Application Data

(60) Provisional application No. 61/973,557, filed on Apr. 1, 2014.

(51) Int. Cl.
*H04W 64/00* (2009.01)
*H04L 29/08* (2006.01)

(52) U.S. Cl.
CPC ............. *H04W 64/006* (2013.01); *H04L 67/18* (2013.01)

(58) Field of Classification Search
CPC . H04W 64/006; H04W 24/06; H04W 64/003; H04W 4/023; H04W 52/0251; H04W 24/10; H04W 4/046; G04W 84/045
USPC ................. 455/404.2, 456.1, 414.1, 7, 456.3; 370/3.28
See application file for complete search history.

(56) References Cited

U.S. PATENT DOCUMENTS

| | | | |
|---|---|---|---|
| 2008/0137663 A1 | 6/2008 | Gu et al. | |
| 2010/0291906 A1* | 11/2010 | DeLuca et al. | 455/414.1 |
| 2012/0102315 A1 | 4/2012 | Holtmanns et al. | |
| 2013/0005352 A1 | 1/2013 | Jones et al. | |
| 2015/0148055 A1* | 5/2015 | Alles et al. | 455/456.1 |
| 2015/0208337 A1* | 7/2015 | Wuellner et al. | 455/456.1 |

FOREIGN PATENT DOCUMENTS

WO    WO 03/055272 A1    7/2003

* cited by examiner

*Primary Examiner* — Phuoc H Doan
(74) *Attorney, Agent, or Firm* — Tarolli, Sundheim, Covell & Tummino LLP (57) ABSTRACT

A location verifier can be configured to receive a location report of a target mobile device, wherein the location report includes data characterizing a location for the target mobile device. The location verifier can also be configured to receive a list of mobile devices that are within a predefined proximity of the target mobile device. The location verifier can further be configured to interrogate each mobile device in the list of mobile devices for a list of detected devices. Each device in the list of detected devices can be detected through peer-to-peer communications.

23 Claims, 7 Drawing Sheets

LOCATION VERIFICATION

CROSS-REFERENCE TO RELATED APPLICATION

This application claims the benefit of priority to U.S. Provisional Application No. 61/973,557, filed on Apr. 1, 2014, and entitled PEER BASED LOCATION VERIFICATION, the entirety of which is herein incorporated by reference.

TECHNICAL FIELD

This disclosure relates to a location verifier.

BACKGROUND

Location tracking can refer to the attaining of the current position of a mobile device (e.g., mobile phone) regardless of whether the device is stationary or moving. Localization may be accomplished in many ways. Localization can be accomplished via multilateration of radio signals between (three or more) radio towers of the network and the device; signal strength translates to range and the intersection of range arcs from three (3) or more antenna locations creates a localization ellipse in which the mobile device is located. Similarly, localization may be accomplished via multi-angulation. Standard cellular antenna towers, by their very construction, break the 360 degrees of arc surrounding the tower into multiple sectors (e.g., cell site sectors). Receipt of signals from a mobile device by such a cellular antenna array can easily be interpreted as an angular measurement or azimuth angle measured from True North representing the vector from the antenna to the mobile device. Azimuth angles from three (3) or more antenna sites can be multi-angulated to create a localization ellipse in which the mobile device is located. Localization could be accomplished by simply as using the known location and effective range of a low power communication node such as a pico cell (a.k.a. femto cell) many of which can only communicate with mobile devices at ranges short enough to qualify with the Federal Communications Commission (F.C.C.) as "precise locations." Alternatively, localization could simply be determined by the mobile device itself, via a global positioning system (GPS) or similar space or airborne based localization mechanisms, and then reported by the mobile device to core telecommunications infrastructure.

The Mobile Location Protocol (MLP) is an application-level protocol for receiving the position of Mobile Stations (e.g., mobile phones, wireless devices, etc.) independent of underlying network technology. The MLP serves as the interface between a Location Server and a location-based application. MLP Services are based on location services defined by the third generation partner project (3GPP).

Many users of mobile devices (e.g., mobile phones, smart phones, etc.) live and/or work in close proximity to anywhere from hundreds of other users of mobile devices to millions of other users of mobile devices if the mobile device users live within the boundaries of heavily populated urban areas. Many mobile devices includes some form of self-location technology including but not limited to systems such as the systems such as the United States' Global Positioning System (GPS), Russia's GLObalnaya NAvigatsionnaya Sputnikovaya Sistema (GLONASS), the European Galileo Global Navigation Satellite System (GNSS), etc.

SUMMARY

One example relates to a location verifier including one or more computers having machine readable instructions. The location verifier can be configured to receive a location report of a target mobile device, wherein the location report includes data characterizing a location for the target mobile device. The location verifier can also be configured receive a list of mobile devices that are within a predefined proximity of the target mobile device. The location verifier can further be configured to interrogate each mobile device in the list of mobile devices for a list of detected devices. Each device in the list of detected devices can be detected through peer-to-peer communications.

Another example relates to a system that can include memory configured to store machine readable instructions and a processing unit configured to access the memory and execute the machine readable instructions. The machine readable instructions can include a target identifier configured to receive a location report from a target device that characterizes a location for the target device. The machine readable instructions can also include a proximity evaluation system (PES) interface configured to query a PES for a list of mobile devices that are within a predefined proximity of the location characterized in the location report.

Yet another example relates to a method that can include querying a proximity evaluation system (PES) for a list of mobile devices that are within a predefined distance of a location characterized in a location report received from a target mobile device. The method can also include interrogating each of the mobile devices in the list of mobile devices for wireless devices that are detected through a peer-to-peer communication protocol.

DETAILED DESCRIPTION

It is possible that mobile devices will regularly report a location in the form of location information so as to secure the benefit of a wide variety of location enabled applications. Such a report of location information can be referred to as a location report. A Proximity Evaluation System (PES) can provide a relatively quick determination of proximity of a large group of mobile devices for a given location. There are a variety of methods or mechanisms including but not limited to Home Location Registry (HLR) and the GeoNexus service (a.k.a. GeoTrove, a.k.a. CARD Nexus) that can be employed as a PES to not only receive and catalog a continuous flow of location reports pertaining to mobile devices but also maintains the ability to find other mobile devices that are close enough to a target mobile device's reported location to be able to detect standard peer-to-peer emanations (including but not limited to Bluetooth) from the target mobile device.

The PES can be implemented, for example, as a cloud server system. In some situations, the PES can track the position (within a predetermined degree of proximity) of nearly every mobile device in the world, region or local area. As one example, the PES can provide a list of mobile devices that are within range of a particular geographic location. As explained herein, this list of mobile devices can be employed to verify the location of a mobile device at the geographic location.

In some examples, location services and location infrastructure (or another application) can leverage the PES to verify a location report provided from a mobile device (e.g., an end-user device, such as a mobile phone, tablet computer, a laptop computer, etc.) to a location service and/or location infrastructure. In situations where location reporting is voluntary, wherein the location report is based on location technology included within mobile device rather than location technology built into telecommunications infrastructure such as cellular towers and base stations, there is a possibility that the location report could be altered (e.g., spoofed) in a manner that appears normal but actually does not represent the true location of the mobile device.

Voluntary location reports (e.g., location information) can be quickly verified by a location verifier. To verify the location report the location verifier can access anonymized data from other mobile devices and/or stationary devices that are within close proximity of a reported location characterized in the location report. In such a situation, the location verifier can attempt to avoid using only nearby devices that are known associates of the reporting device, hereafter referred to as the "target device". Such a dis-association enhancement can circumvent (and possibly detect) a broader spoof where multiple associated mobile devices collude with a user of the target device to help identify an inaccurate, erroneous and/or misleading location report. For instance, if associated mobile devices indicated peer-to-peer detection of the target device but disassociated mobile devices did not indicate peer-to-peer detection of the target device, this fact may very well constitute meaningful intelligence about the target device and the owner of the target device and the owner of the target device's trusted circle.

Figure 1:
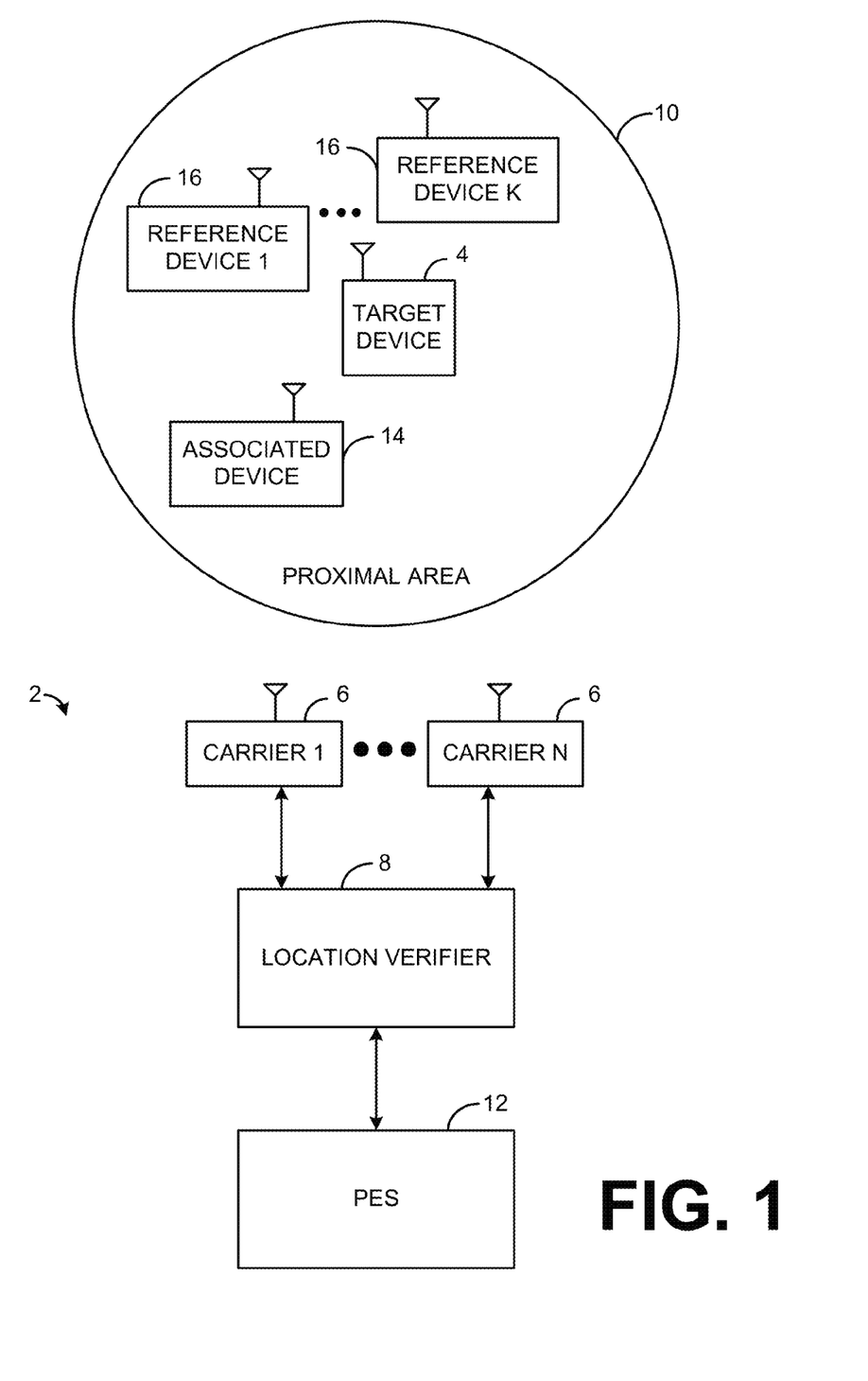
FIG. 1 illustrates an example of a system that can implement peer-based location verification.

FIG. 1 illustrates a system 2 that can be employed to verify a location report of a target device 4. The location report can include, for example, data that characterizes a geographic location (e.g., latitude and longitudinal coordinates) of the target device 4 as well as data that uniquely identifies the target device 4 (e.g., an IP address, a media access control (MAC) address, a Bluetooth identifier, a telephone number, a mobile station identifier (MSID), an International Mobile Subscriber Identity (IMSI), etc.). The target device 4 can be, for example, a mobile device, such as a wireless phone, a smart phone, a tablet computer, a wearable technology device (e.g., a smart watch or smart glasses), etc. In some examples, the target device 4 can be employed by a target user. In some examples, the target user may be, for example, under surveillance, such as a suspect in a criminal investigation or the target user could be an individual with a high level of security. In other examples, the target user can have a financial interest that would increase a likelihood that the target user would benefit from "spoofing" a reported location.

The system can include M number of telecommunications carriers 6, ("labeled in FIG. 1 as carrier 1 to carrier M"), where M is an integer greater than or equal to one. Each of the M number of carriers 6 can be, for example a wireless carrier, such as a subscription based service provider. The target device 4 can communicate with a given carrier 6 of the M number of carriers.

The system 2 can include a location verifier 8 that can receive the location report from the target device 4. The location report can be provided, for example, via the mobile location protocol (MLP) and transmitted through a given carrier 6 of the M number of carriers 6. In other examples, the location report can be provided via a public network, such as the Internet. The location verifier 8 could be implemented, for example, as machine readable instructions stored in a memory (e.g., software). In some examples, the target device 4 can be executing an application that periodically provides the location report to the location verifier 8, wherein the location report at a given instance in time characterizes a current location of the target device (e.g., a push operation). In other examples, the location report can be provided in response to a location request provided from the location verifier 8 (e.g., a pull operation).

In some situations, the target device 4 can be configured to provide the location report to the location verifier 8 voluntarily (e.g., through the above mentioned application). In other examples, the location report can be extracted from the target device 4 without the permission and/or knowledge of the target user. For instance, if the target user is a suspect in a criminal investigation, a warrant may be issued allowing extraction of the location report without the target user's permission and/or knowledge.

The location report can characterize a geographical location of the target device 4. The location report could be, for example, global position coordinates (e.g., longitudinal and latitudinal coordinates) of the target device 4. In some instances, the location report can be derived by the target device 4 through the employment of a global positioning system (GPS), triangulation data and/or trilateration data. In some situations, the target device 4 can also provide the location verifier 8 with a list of devices that are detected through radio frequency (RF) signals (e.g., peer-to-peer) signals, such as Bluetooth signals, WiFi signals, etc.

The location verifier 8 can be implemented to verify the location report of the target device 4 to increase the likelihood that the target device 4 is in fact at the position identified in the location report and not at some other location. Thus, the location verifier 8 can be employed to ensure that the target device 4 is not spoofing the location identified in the location report. In some examples, the location verifier 8 can determine an "RF fingerprint" for the target device 4 that can be based on the list of devices that are detected at the location identified in the location report provided from the target device 4. To verify the location of the target device 4, the location verifier 8 can determine a proximal area 10. The proximal area 10 can be a geographic region with a center (or nearly center) located at the geographical location identified in the location report of the target device. In some examples, the proximal area 10 can have a radius of about 200 meters or less, 100 meters or less, 50 meters or less (e.g., 40 meters), etc.

The location verifier 8 can provide a proximity query to a PES 12. The PES 12 can be implemented as a cloud based server system that can track a location of mobile devices throughout the world. The proximity query can include a request for a list of mobile devices inside of the proximal area 10. The PES 12 can provide the list of mobile devices in the proximal area 10 in response to the proximity query. The mobile devices could be, for example, smart phones, wireless phones, wearable technology devices, etc.

The PES 12 can be implemented in a variety of different ways. In some examples, the PES 12 can be implemented as a passive location system (e.g., the GeoNexus service). In other examples, the PES 12 can be implemented as a home location register (HLR) of a carrier network. In still other examples, the PES 12 can be implemented as a cellular broadcast system of a carrier network.

The location verifier 8 can select a subset of mobile devices in the list of mobile devices to verify the location of the target device 4. In some examples, the location verifier 8 can exclude an associated device 14 from the selected subset of devices. In such a situation, the associated device 14 may have a user associated with the target user. Identification of the user associated with the target user and/or the associated device 14 can be based, for example, on a priori information, such as information derived from social media (e.g., a direct social media link to the target user), a criminal database, chatter (e.g., information derived from signal intelligence), etc. In the example where the target user is a person of interest in a criminal investigation, the user of the associated device 14 may have an incentive to spoof the location of the target device 4. For instance, the user of the associated device 14 and the target user may be members of the same criminal organization (e.g., gang, mafia, terrorist cell, etc.). Thus, some information from the associated device 14 may not be reliable or is in fact likely to be unreliable. In other examples, the subset of mobile devices in the list of mobile devices can include the associated device 14, but the association between the associated device 14 and the target device 4 can be recorded by the location verifier 8.

The subset of mobile devices selected to verify the target device 4 can be referred to as reference devices 16. As noted the reference devices 16 can, in some examples, include the associated 14. In the present example, there are K number of reference devices 16, where K is an integer greater than or equal to one. The location verifier 8 can interrogate each of the reference devices 16 for a detected device list corresponding to a list of mobile devices that are detected by each of the reference devices 16. In response to the interrogation, the location verifier 8 can receive the detected device list from one or more of the K number of reference devices 16. Messaging for the interrogation can be completed, for example by employing a protocol such as Short Message Service (SMS) messaging, Session Initiation Protocol (SIP) messaging, Mobile Management Entity (MME) messaging, Hyper Text Transfer Protocol (HTTP) messaging, Transmission Control Protocol/Internet Protocol (TCP/IP) messaging, etc. Additionally or alternatively, the interrogation of each of the K number of reference devices 16 can include a location report request. In such a situation, the response to the interrogation provided from each of the K number of reference devices 16 can include a location report that includes data characterizing a location of a respective reference device 16.

Each of the K number of reference devices 16 can be configured to have the capability of detecting electromagnetic (EM) radiation (e.g., radio frequency (RF) signals) output by the other devices, including the target device 4. For example, one or more of the K number of reference devices 16 can have Bluetooth enabled. Additionally or alternatively, one or more of the K number of reference devices 16 can detect WiFi signals emitted and/or cellular data signals emitted. In other examples, any other peer-to-peer network protocol could be additionally or alternatively employed, such as the prefix routing over set elements (PROSE) protocol, protocols set forth by the San Diego Research Center (SDRC), etc. The detected device list received from the K number of reference devices 16 can include an identifier of any devices that are detected within a relatively short range (e.g., via Bluetooth, WiFi, cellular data, PROSE, or some other peer-to-peer networking protocol) by a corresponding one of the K number of reference devices 16. Such identifiers could be, for example, a unique identifier (e.g., a MAC address, an IP address, a Bluetooth device identifier, an MSID, etc.) of devices that are detected within the relatively short range of a respective reference device 16.

In some examples, the detected device list can be received by the location verifier 8 from the one or more K number of reference devices 16 through anonymous operation. In some situations, the detected device list can be voluntarily provided to another service, such as the PES 12. In other situations, the detected device list can be actively retrieved (e.g., through an application). However, in either situation, the detected device list can be transmitted and/or received anonymously, such that a user of the corresponding reference device 16 need not be identified.

The detected device list of the one or more of the K number of reference devices 16 can be compared against a unique identifier of the target device 4 by the location verifier 8. If the unique identifier of the target device 4 is listed on the detected device list of any of the K number of reference devices 16, the location verifier 8 can determine that the location identified by the location report of the target device is trustworthy, thereby reducing the likelihood that the target device 4 is spoofing its location. Alternatively, if the location verifier 8 does not receive any matches of the unique identifier of the target device 4 and the unique identifiers in the detected device list from any of the K number of reference devices 16, the location verifier 8 can determine that there is an increased likelihood that the target device is in fact spoofing its location. Additionally, in such a situation, the location verifier 8 can determine that the location identified in the location report of the target device 4 may not be trustworthy. This likelihood (of unreliability) can be further increased if the geographic location identified in the location report from the associated device 14 matches the location identified in the location report for the target device 4. Thus, the location verifier 8 can generate a confidence value that characterizes a degree of trustworthiness of the location characterized in the location report provided from the target device 4. By employing this system, the location of the target device 4 can be verified without the need to query (sometimes expensive) wireless carrier equipment. Instead, the location of the target device 4 can be confirmed using only peer-to-peer based technologies.

As noted, in some examples, a location report from each of the K number of reference devices 16 can be provided to the location verifier 8. In such a situation, the location verifier 4 can determine an RF fingerprint for each of the K number of reference devices 16. Additionally, the location verifier 4 compare the RF fingerprint of the target device 4 with the RF fingerprint of each of the K number of reference devices 16. Based on the similarities and differences of the RF fingerprints, the location verifier 4 can increase or decrease the confidence that the location report of the target device 4 is trustworthy.

It is noted that the location verifier 8 can also be used as a verification of a calibration of positioning systems (e.g., a GPS) within the target device 4. For instance, in a test environment, a location verification process can be executed by the location verifier 8 with controlled reference devices 16 and a controlled target device 4. In such a situation, if the location verifier 8 determines that no match is found between the unique identifier of the target device 4 and unique identifiers in the detected device list provided by the reference devices 16, it can be determined that the position system of the target device 4 is not properly calibrated and/or is otherwise malfunctioning. However, if the location verifier 8 determines that the unique identifier of the target device 4 is included in the detected device list provided by the reference devices 16, the location verifier 8 can determine that the positioning system of the target device 4 is calibrated and is operating properly.

Figure 2:
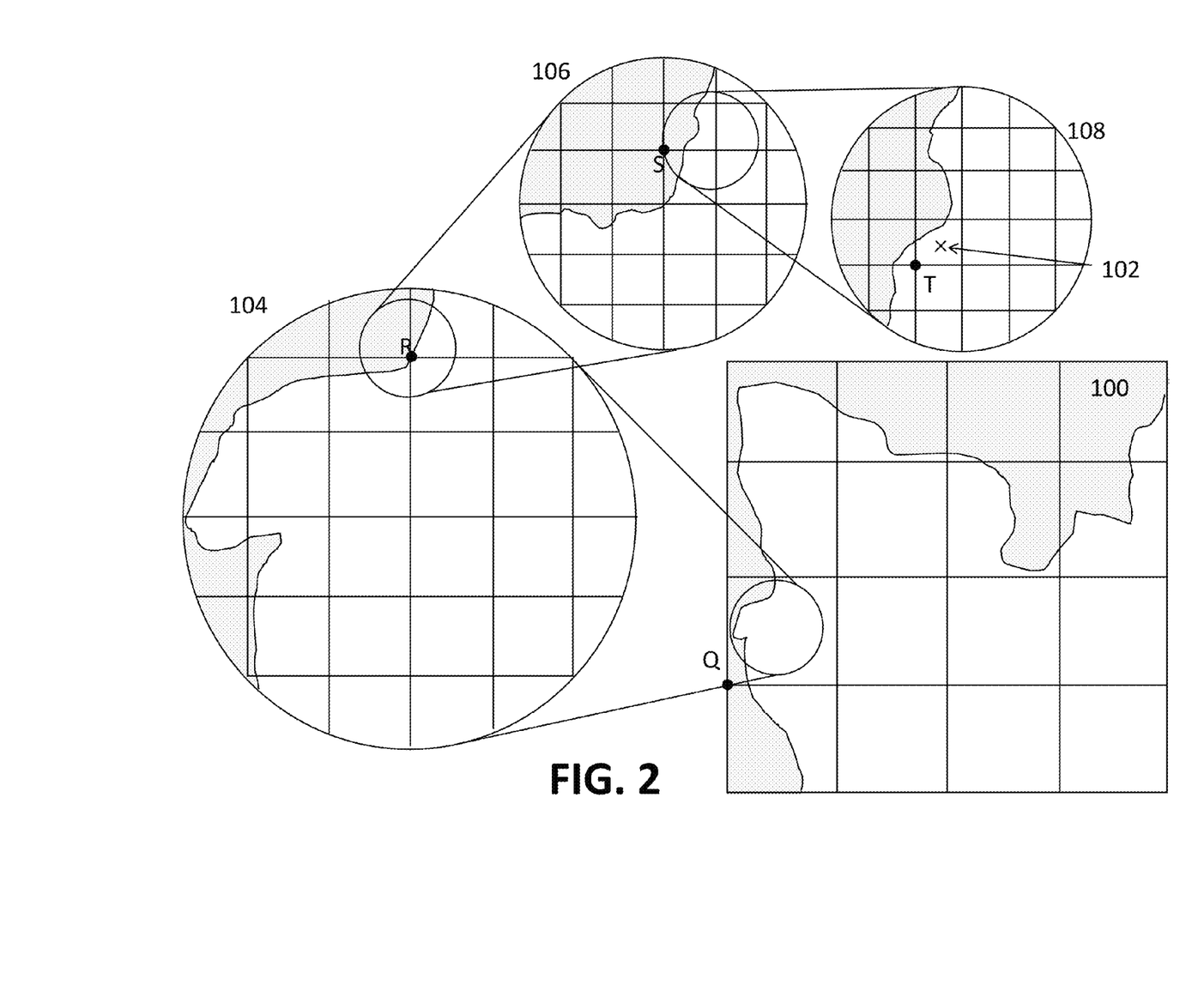
FIG. 2 illustrates location fidelities depicting a location of a target device.

FIG. 2 illustrates a series of location fidelities 100, 104, 106 and 108 that each include a location 102 that is characterized in a location report provided from a target device, such as the target device 4 illustrated in FIG. 1. That is, the location fidelities (or simply, fidelities) 100, 104, 106 and 108 roughly illustrate examples of Primary, Secondary, Tertiary and Quaternary layers described herein. In the example illustrated in FIG. 2, the location report can be characterized as latitude and longitude coordinates. The location report could be provided, for example, to the location verifier 8 of FIG. 1. FIG. 2 illustrates four different fidelities namely fidelity 100, fidelity 104, fidelity 106 and fidelity 108, each with a different resolution.

The location verifier can provide the location 102 to the PES (e.g., the PES 12 of FIG. 1) and provide a proximity query the PES for other mobile devices that are within a close proximity of the target device. The PES can convert the location 102, represented, e.g., in decimal degrees of latitude and longitude, into indices of latitude and indices of longitude within four (4) successive layers: 1) Primary 120: tens of degrees (about 1126 kilometer or about 700 statute mile resolution); 2) Secondary 121: degrees (about 113 kilometer or about 70 statute mile resolution); 3) Tertiary 122: minutes (about 1828 meter or about 6000 foot resolution); and 4) Quaternary 123: seconds (about 30 meter or about 100 foot resolution). By employing the successive layers, the Earth's surface can be covered with successively finer grained gridlines. Seconds of latitude and longitude yield a grid whose vertices are about 30 meters (about 100 feet) apart at the equator and somewhat closer together the farther away from the equator (North or South) the location 102 reported by the target device. In examples where a finer granularity than seconds is needed, a fifth (Quinary) and even sixth (Senary) layer may be added to represent 10 ths of seconds (e.g., about 3 meters (about 10 feet)) and 100 ths of seconds (e.g., about 0.3 meters (about 12 inches)).

In some examples, the PES can be implemented as a location management service such as "GeoNexus" that can provide a list of mobile devices to the location verifier (e.g., the location verifier 8 of FIG. 1) that have peer-to-peer capability, such that the location verifier 8 can verify the location 102 characterized in the location report provided by the target device (e.g., the target device 4 illustrated in FIG. 1). The function of a GeoNexus location management service (hereinafter, referred to simply as the "GeoNexus service") will be described in detail to demonstrate a mechanism employable as the PES that allows the rapid identification of mobile devices in proximity of a specified location (the location 102). However, other mechanisms, methods and systems can alternatively be employed as the PES and leveraged by the location verifier.

The GeoNexus service can be configured such that each time a mobile device with peer-to-peer capabilities has a location registered with the GeoNexus service, the GeoNexus service can save an identifier, a location (latitude and longitude), and optimization indices in a location (LOC) table.

Figure 3:
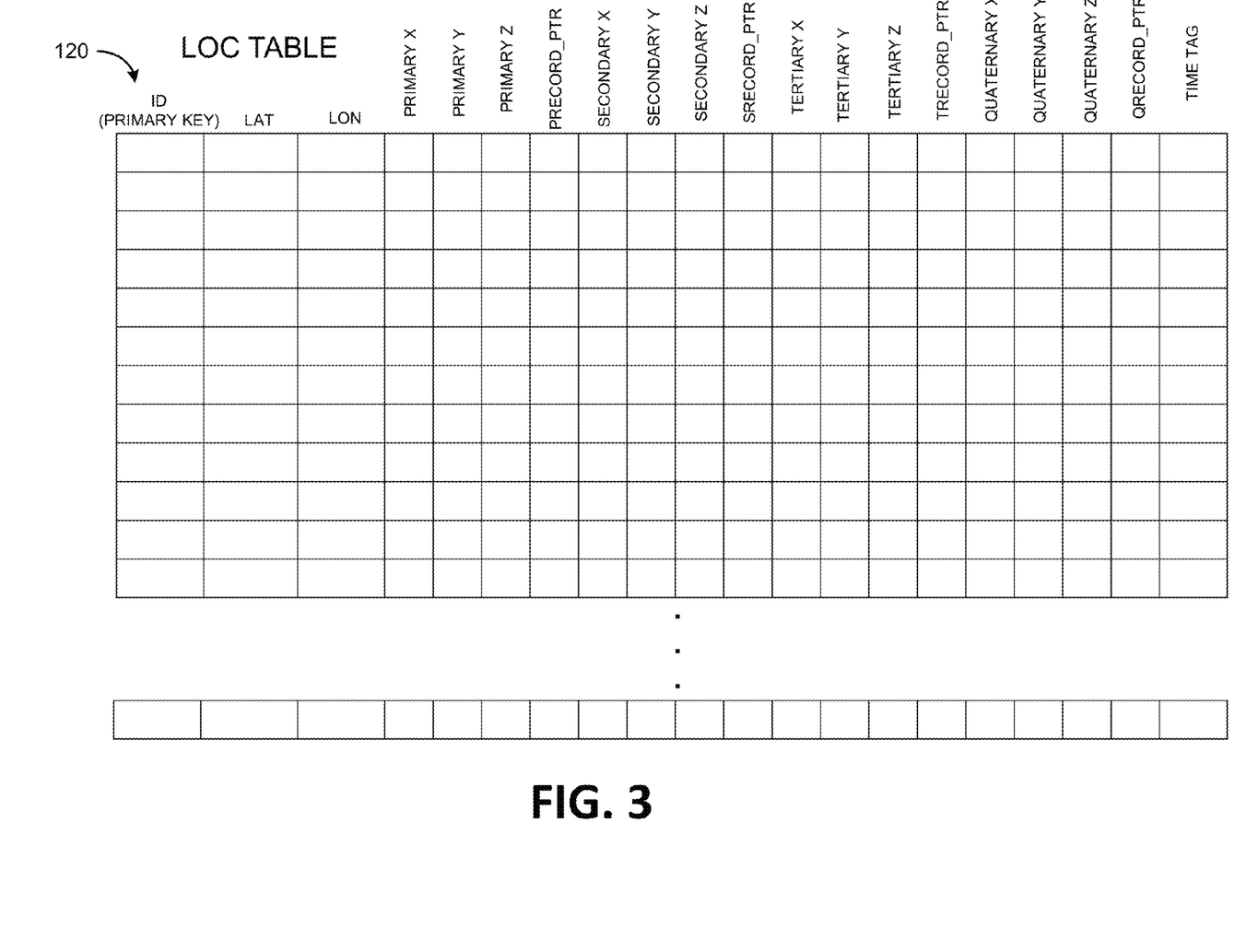
FIG. 3 illustrates an example of a location table employed by a PES.

FIG. 3 illustrates an example of a LOC table 120 the can be employed by the GeoNexus service. In the LOC table 120, the Latitude and Longitude (labeled in FIG. 3 as "LAT" and "LON", respectively) values can be normalized to be decimal degrees in the range −90.0 through +90.0 for Latitude and −180.0 through +180.0 for Longitude. The GeoNexus service can compute the indices by employing the equations given in TABLE 1:

TABLE 1

| PrimaryX | = int(round((Lon/10.0) − 0.5)) |
| PrimaryY | = int(round((Lat/10.0) − 0.5)) |
| PrimaryZ | = Altitude modulo 700 statute miles |
| SecondaryX | = int(truncate(Lon − (PrimaryX * 10.0))) |
| SecondaryY | = int(truncate(Lat − (PrimaryY * 10.0))) |
| SecondaryZ | = Altitude modulo 70 statute miles |
| TertiaryX | = int(truncate((Lon − ((PrimaryX * 10.0) + SecondaryX)) * 60.0)) |
| TertiaryY | = int(truncate((Lat − ((PrimaryY * 10.0) + SecondaryY)) * 60.0)) |
| TertiaryZ | = Altitude modulo 6000 feet |
| QuaternaryX | = int(truncate((Lon − ((PrimaryX * 10.0) + SecondaryX + (TertiaryX/60.0))) * 3600.0)) |
| QuaternaryY | = int(truncate((Lat − ((PrimaryY * 10.0) + SecondaryY + (TertiaryY/60.0))) * 3600.0)) |
| QuaternaryZ | = Altitude modulo 100 feet |

It is noted that the Equations included in TABLE 1 presume that the round( ) function rounds an "n.5" value up such that 0.5 becomes 1.0, 2.5 becomes 3.0, −3.5 becomes −3.0, etc. Some adjustments may be made to accommodate specific hardware architectures, operating systems, and compilers, as will be appreciated by those of skill in the art.

Referring back to FIG. 2, the GeoNexus service can be configured to compute an index based on the lower left corner of the square in which the target device (e.g., the target device 4 of FIG. 1) is located. The Primary square (labeled as 'Q' in FIG. 2 of the fidelity 100) is a 10 degree by 10 degree square. The Secondary square (labeled as 'R' in FIG. 2 of the fidelity 104) is a one degree by one degree square located within the Primary square. The Tertiary square (labeled as 'S' in FIG. 2 of the fidelity 106) is a one minute by one minute square located within the Secondary square. The Quaternary square (labeled as 'T' in FIG. 2 of the fidelity 108) is a one second by one second square located within the Tertiary square. The GeoNexus service can employ TABLE 1 to derive ranges included in TABLE 2.

TABLE 2

| −18 <= PrimaryX <= 18 | −9 <= PrimaryY <= 9 | −1 <= PrimaryZ <= 36 |
| 0 <= SecondaryX <= 9 | 0 <= SecondaryY <= 9 | −1 <= SecondaryZ <= 357 |
| 0 <= TertiaryX <= 60 | 0 <= TertiaryY <= 60 | −1 <= TertiaryZ <= 22,000 |
| 0 <= QuaternaryX <= 60 | 0 <= QuaternaryY <= 60 | −3 <= QuaternaryZ <= 1.32e06 |

Figure 4:
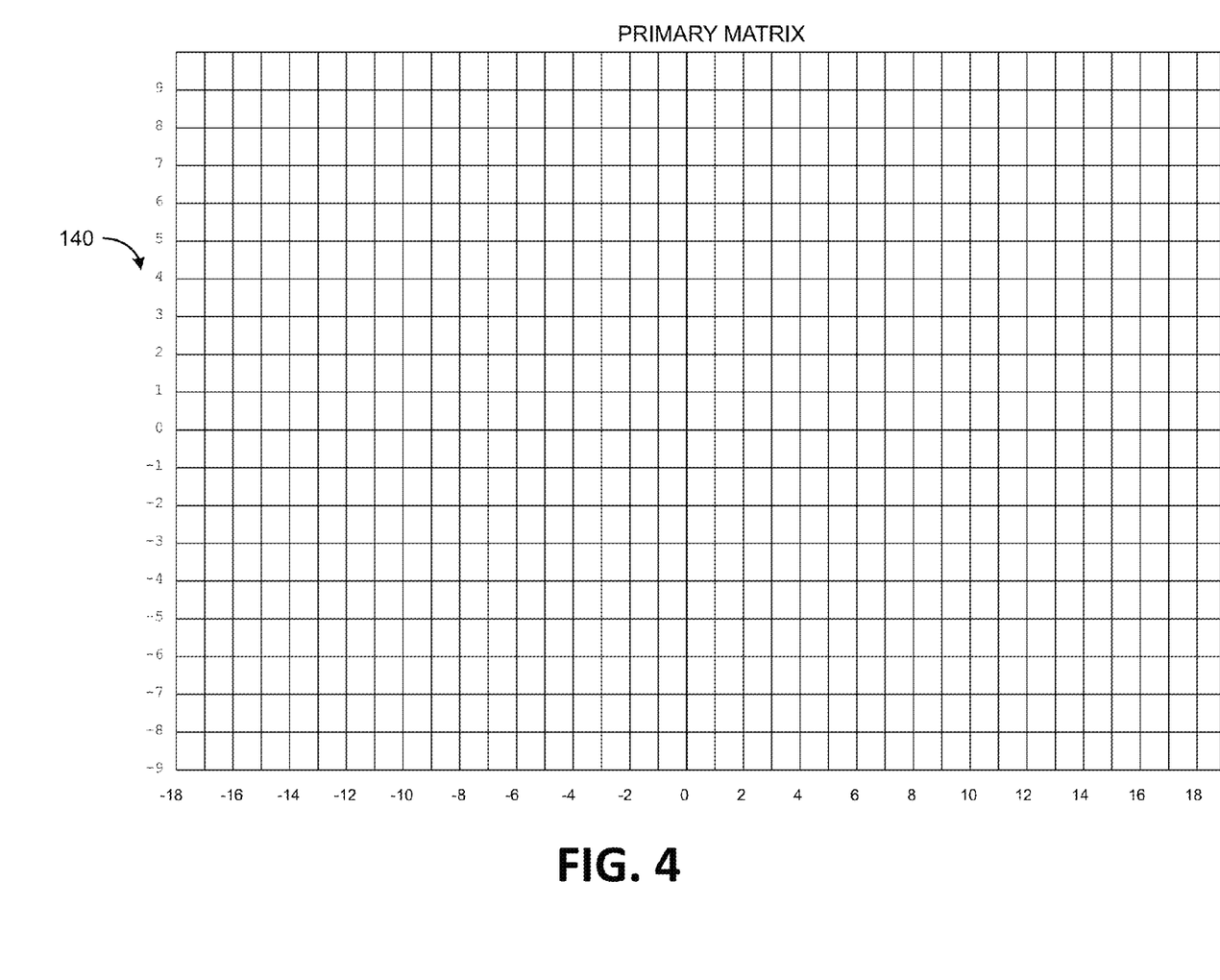
FIG. 4 illustrates an example of a primary matrix employed by a PES.

FIG. 4 illustrates an example of a primary matrix 140 that can be employed by the GeoNexus service. In particular, as illustrated in the primary matrix 140 of FIG. 4, the GeoNexus service can maintain a collection of matrices. This collection of matrices can include a matrix for the Primary indices (e.g., a "Primary Matrix"). In some examples, the primary matrix 140 can be accompanied by a PrimaryCount that can indicate how many mobile devices are present. Additionally, the Primary matrix 140 can also be accompanied by an array or list of the primary matrix elements in which mobile devices can be found. (The list can be empty if PrimaryCount is zero.)

In some examples, each element in the 36×18 Primary matrix 140 can contains: (1) a count of how many wireless devices are present in that particular 10 deg×10 deg area; and (2) a reference to a Secondary Matrix. (The reference can be set to NULL if count is zero). Secondary (10×10 matrix), Tertiary (60×60), and Quaternary (60×60) matrices are allocated, maintained, and eliminated as needed to manage the GeoNexus service's memory use.

Each Secondary Matrix can be accompanied by a SecondaryCount indicating how many mobile devices are present in a corresponding 10 deg×10 deg area. Each Secondary Matrix can also be accompanied by an array or list of the secondary matrix elements in which mobile devices can be found. (The list can be empty if its SecondaryCount is zero.) Each element in a 10×10 Secondary matrix can contain: (1) a count of how many wireless devices are present in that particular 1 deg×1 deg area; and (2) a reference to a Tertiary Matrix. (The reference can be set to NULL if the count is zero.)

Each Tertiary Matrix can be accompanied by a TertiaryCount indicating how many mobile devices are present in that 1 deg×1 deg area. Each Tertiary Matrix can also be accompanied by an array or list of the tertiary matrix elements in which wireless devices can be found. (The list is empty if its TertiaryCount is zero.) Each element in a 60×60 Tertiary matrix can contain: (1) a count of how many wireless devices are present in that particular 1 minute×1 minute area; and (2) a reference to a Quaternary Matrix. (The reference can be set to NULL if the count is zero.)

Each Quaternary Matrix can be accompanied by a QuaternaryCount indicating how many wireless devices are present in that 1 min×1 min area. Each Quaternary Matrix can also accompanied by an array or list of the quaternary elements in which wireless devices can be found. (The list is empty if QuaternaryCount is zero.) Each element in a 60×60 Quaternary matrix contains: (1) a count of how many wireless devices are present in that particular 1 second×1 second area; and (2) an array or list of wireless device Identifiers that are present in the 1 sec×1 sec area. (The list can be empty if count is zero.)

The evaluation of 'Z' axis differences are can be evaluated by the GeoNexus service in near real-time as a simple difference of like Z values (e.g., primary, secondary, tertiary, etc.). If the absolute value of the computed Z-difference (e.g., $\Delta Z$) is within the defined vertical bounds of proximity, then proximity of the target device 4 can be established. This four (4) tier data structure (the Primary, Secondary, Tertiary and Quaternary Matrices) makes it possible for the GeoNexus service to rapidly identify each mobile device within a predefined or preconfigured proximity so that location verifier 8 can analyze the results in a timely manner.

Proximity can be a configured reference value, e.g., defined in terms of feet, tens of feet, yards, meters, etc. The GeoNexus service can be programmed to rapidly identify mobile or stationary devices that meet the proximity criteria. Peer-to-Peer communication is possible over relatively short ranges. Accordingly, queries by the location verifier to the GeoNexus service for mobile devices that are within a predefined proximity to a target device do not cause unacceptable delays.

The GeoNexus service can be implemented as an array of computing devices in which each node in the array is responsible for tabulating the location report for each mobile device within a corresponding area of coverage at a very specific level of granularity. The GeoNexus service can index each mobile device's identifier into a particular "bucket" (e.g., node) within every level of granularity. Accordingly, at the lowest fidelity (e.g., least level of granularity) where each area of coverage is approximately 1126 kilometers by 1126 kilometers (about 700 miles by about 700 miles) there may be an enormous number of mobile devices logged within any particular bucket/node and the location at that level of fidelity of every device within that bucket/node can be represented as the node's center latitude/longitude. That will, of course, be a coarse location. The GeoNexus service can be configured with either five or six distinct levels of granularity/fidelity, though, so in situations where a grossly coarse location is not what a particular consumer/application wants and/or needs the consumer/application can simply query the GeoNexus service for location resolution from a higher fidelity. At the fifth level of fidelity the location associated with each node/bucket is approximately 3 meters (about 10 feet). At the sixth level of fidelity the location associated with each node/bucket is approximately 0.3 meters (e.g., about one foot).

The fundamental approach employed by the GeoNexus service can be precisely the same regardless of the level of fidelity in which the mobile device's location is recorded. In particular, the GeoNexus service can employ the aforementioned Buckets/nodes each of which has an associated location and fidelity. Thus, actual computation executed by the GeoNexus service can be minimal. Stated differently, the GeoNexus service can push bits and bytes back and forth between buckets and inferring location info (and ultimately proximity) from each bucket/node and from adjacent buckets/nodes.

Figure 5:
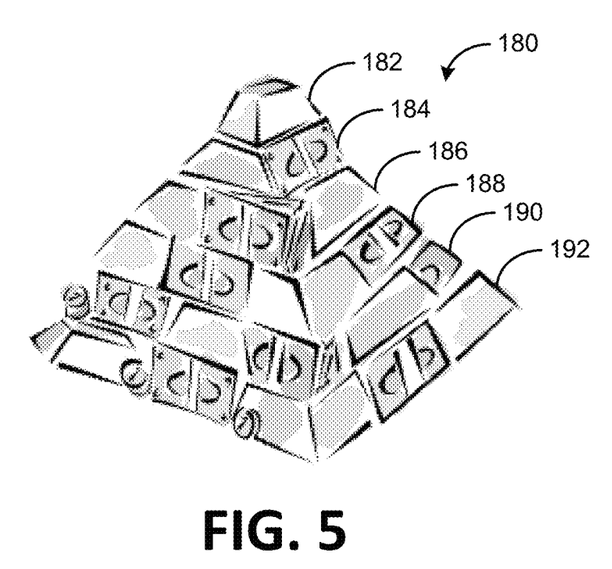
FIG. 5 illustrates a conceptualized example of data processed by the PES.

FIG. 5 illustrates a conceptual example of the data processed by the GeoNexus service. The GeoNexus service can be envisioned as a pyramid 180 of computing devices/elements where the pinnacle 182 of the pyramid represents every mobile device as being in one big bucket covering the entire planet and each lower layer 184, 186, 188, 190 and 192 of the pyramid 180 has more and more buckets to cover the same area as was covered by the layer above. The pyramid 180 does not need to be evenly distributed. The approach increases the density of computing devices/elements in direct proportion to the population density of the area of coverage. In some examples, it is possible that a single computation device/element can be used to cover almost all of the ocean area for the planet with separate computation devices/elements to handle the population centers of Hawaii, Samoa, Fiji, and other islands scattered among the oceans of the planet. Dense concentrations of computation devices/elements may be needed to cover immensely dense population centers like Los Angeles, New York and its many Boroughs, Hong Kong, London, etc. It is possible that in immensely dense population centers that certain operations such as proximity evaluations can be limited only to the very high fidelity location layers (e.g., the lower levels) within the pyramid. Each bucket/node can include data characterizing the associated area of coverage and location fidelity. Additionally, each bucket/node can communicate with each adjacent node (and the area of coverage associated with the adjacent bucket/node) to enable rapid proximity evaluations.

In addition to the pyramid 180 of computation devices/elements tabulating buckets of mobiles (from which location can be inferred) the GeoNexus service can also maintain a fairly simple (but relatively large) data array in which every mobile device is represented. The GeoNexus service can record the precise latitude and longitude of the mobile device (if known) in the array and also record the indices within each layer of the pyramid in which the mobile device has been bucketed. This array can be referred to as a "MOBILE_DEVICE array" and can be quintessential to optimizing update and targeted query speeds. A location update for a given mobile device can include erasing an old (previous) location of the given mobile device and recording an updated (new) location in the MOBILE_DEVICE array. This can be executed by the GeoNexus service by performing the following operations:

1. employing the MOBILE_DEVICE array to directly access the old buckets in which the given mobile device is recorded for removal
2. computing the new bucket indices within each and every layer of fidelity
3. save the mobile device id of the given mobile device within the new buckets for each layer of fidelity
4. saving the bucket indices in the MOBILE_DEVICE array In response to receipt of a request for the location of a particular mobile device (targeted location query) the GeoNexus service can look up the precise location saved in the MOBILE_DEVICE array or simply extract the location associated with the highest fidelity node/bucket and then return the value. In situations where an application, such as the location verifier 8 of FIG. 1 needs to evaluate proximity of a group of persons (as identified by their preferred mobile device) to a place—rather a form of geofencing—the application needs only to compute the bucket index of the place and then directly query the node responsible for that bucket and send a request to the node to query adjacent nodes (sibling nodes). In some situations, this process may include a small sequence of queries if the geofence has an irregular outline but even a small sequence of queries can be evaluated in this way relatively quickly. The GeoNexus service can return an answer to each query that would be either a "NO" (no proximity detected) or a "YES" with a bucket index.

The architecture of GeoNexus service can support small groups such as trusted circles and the GeoNexus service can also make it possible to support much larger and more ambiguous groups such as affinity groups derived from Facebook's many forms of "likes", "dislikes", "friends", and other forms of "interest groups". Groups such as those might have 1000s or 10s of thousands of members and the membership could change frequently.

The GeoNexus service can be configured to respond to queries for a plurality of mobile devices within some predefined distance, 'N', of the target device's reported location (e.g., the location 102 in FIG. 2). In one example, such a query for mobile devices can include, but is not limited to, several arguments as detailed below:

```
deviceRecord *GeoNexus.queryListOfProximateDevices(
    unsigned integer    responseListLimit,
    double              reference_Latitude,
    double              reference_Longitude,
    double              reference_distance,
    attributeRecord     *requiredAttributesList,
    attributeRecord     *desiredAttributesList,
    deviceRecord        *exclusionList,
    ... );
```

The variable responseListLimit can represents a maximum number of mobile devices needed to be in the returned list of mobile devices, the reference latitude and longitude values can be set to a center of the search area (for the purposes of simplification of explanation, this location stipulated as the location contained within the target device's location report), the reference distance can be a value computed as 50% of the maximum range associated with a chosen peer-to-peer technology. The attribute required list is a listing of attributes that resulting devices needs to have to be included in the response, the desired attribute list is a listing of all attributes that the location verifier would prefer the devices to have, and the exclusion list is a list of devices that the queryListOfProximateDevices( ) should not include in its response.

For the purposes of simplification of explanation the syntax used to describe the query, above, is representative of an implementation using the programming language "C" or the programming language "C++". However, any implementation and any syntax can be employed that stipulates a maximum count, a reference point, a distance from the reference point, a mandatory required "collection" of attributes, an optional desired collection of attributes, and a collection of devices to be excluded from the response, that upon completing its search returns a collection of devices that is less than or equal to the distance from the reference point and includes all stipulated "required" attributes and does not include any device listed in the exclusion list. In some examples, the response to the query can be an empty set if there are no other mobile devices within the specified proximity or if none of the mobile devices are near enough to the target device having the required attribute. As an example, for a search of Bluetooth enabled mobile devices near the target device at least one of the required attributes could be "Bluetooth Capable".

In another example, a version of queryListOfProximateDevices( ) that accepts arguments that stipulate a layer within the GeoNexus service and then the X and Y coordinates of one vertex within that layer as the reference point, rather than a latitude+longitude pair:

```
deviceRecord *GeoNexus.queryListOfProximateDevices(
    unsigned integer    responseListLimit,
    unsigned integer    reference_layer,
    signed integer      reference_X,
    signed integer      reference_Y,
    signed integer      reference_distance,
    attributeRecord     *requiredAttributesList,
    attributeRecord     *desiredAttributesList,
    deviceRecord        *exclusionList,
    ... );
```

As illustrated, the list of arguments can include but is not limited to a limit on the number of devices included in the returned device list, the reference layer designation, the reference vertex as stipulated by X and Y values, a reference distance, a required attribute list, optional desired attribute list, and list of devices to exclude from the response.

It is not necessary for the implementation to have two (2) full functions or methods both of which implement the logic needed to fulfill the requirements for determining the list of proximate devices; a valid and desirable optimization would be to implement just enough of the first function or method to convert the reference latitude and longitude into a selected reference layer within the GeoNexus service and a reference X,Y coordinate value within the layer and then simply invoke the second function or method using those computed values. Such an optimization aligns quite well with the structure of the GeoNexus service since all of GeoNexus service's layers are grids and each vertex within the grid provides an approximation of the location of every device included within that vertex.

The requiredAttributeList and desiredAttributeList arguments are provided to allow the invoker (e.g., the location verifier 8 of FIG. 1) to stipulate attributes or capabilities that any device in the returned list needs to have and additional attributes or capabilities that make a device in the returned list more useful to the location verifier. If the returned list is not empty then the mobile devices in that returned list will have the attribute/capabilities included in the requiredAttributeList. Mobile devices that also have any of the attributes/capabilities that were included in the desiredAttributeList will be listed first in the returned list. The more desired attributes/capabilities that a device has the closer to the front of the returned device list it will be positioned. The fewer desired attributes/capabilities that a device has the closer to the end of the returned device list it will be positioned. The GeoNexus service provides the ability to designate more than one attribute/capability both in the required list and in the desired list but in some examples only one required attribute (e.g., "Bluetooth Capable" for example) and no optional or desired attributes may be included.

Additionally, in some examples, the location verifier 8 of FIG. 1 can include the capability to iteratively query GeoNexus service for additional pluralities of mobile devices within 'N' distance of the target device's reported location (e.g., location 102 of FIG. 2); pluralities whose intersection set with previous plurality sets is null. Stated differently, the location verifier can include the capability to iteratively query the GeoNexus service for more mobile devices within 'N' distance of a specified location such that the response from the GeoNexus service delivers different devices than were delivered in previous queries.

For instance, the exclusionList argument included within a version of the queryListOfProximateDevices function/method can specifically be the same type of deviceRecord list that is returned by the function/method itself so that whomever is invoking the query function/method can pass an aggregate of all previous answers back into the function/method to help exclude them from future responses. Accordingly, the first time the function/method is invoked the exclusionList argument may well be an empty list. The second time the function/method is invoked the exclusionList will likely be an exact copy of the deviceRecord list returned by the first invocation. The third time the function/method is invoked the exclusionList will likely be a union of the list returned by the first invocation and the list returned by the second invocation. In such a manner the invoker (e.g., the location verifier 8 of FIG. 1) can ensure that no subsequent invocation will return the mobile devices that have been included in the device returned by previous invocations. This gives location verifier the ability to rapidly cull devices near the target device so as to identify and isolate only those devices that have the capability to use the chosen or preferred peer-to-peer technology.

Figure 6:
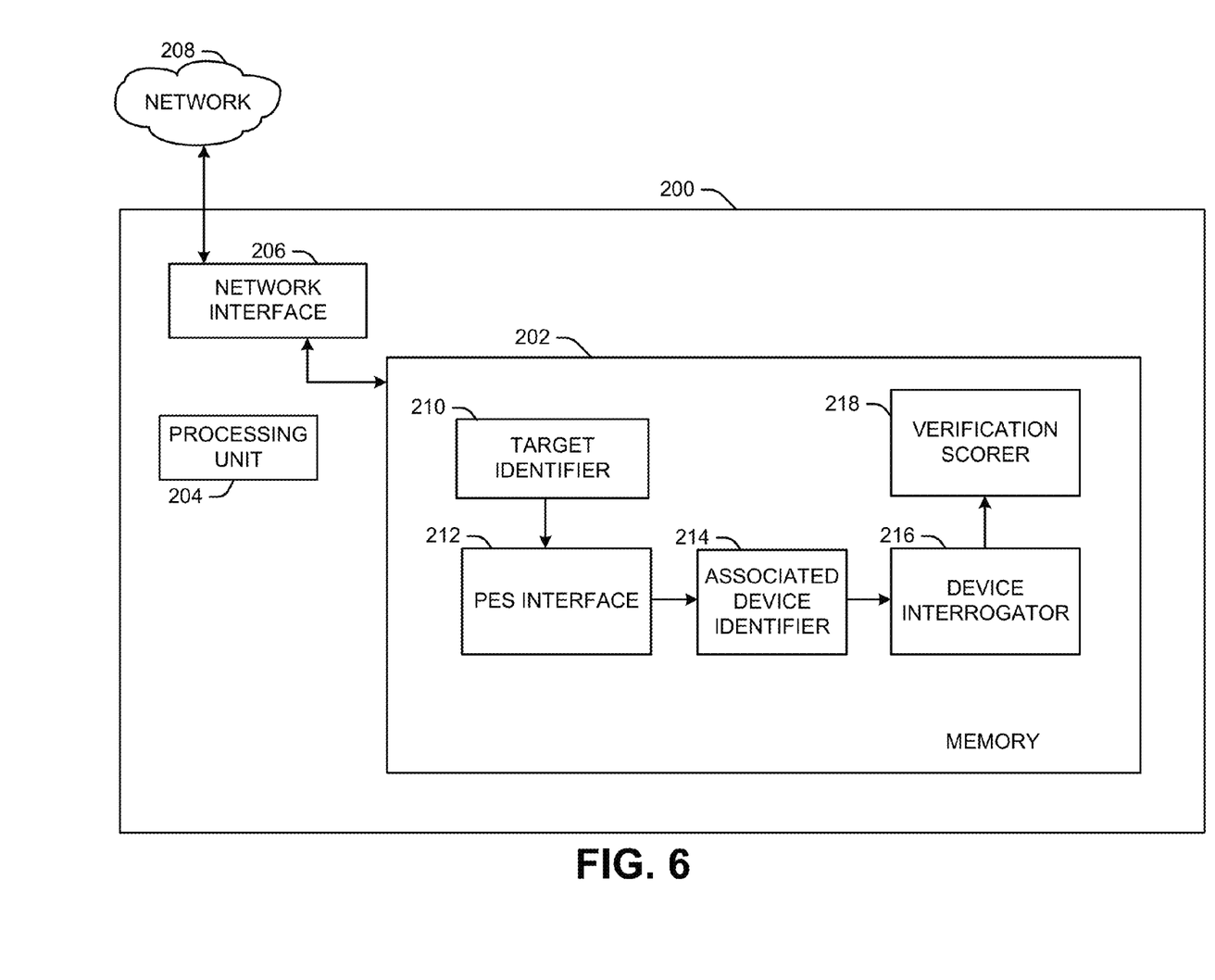
FIG. 6 illustrates a location verifier to verify the location of a target device.

FIG. 6 illustrates an example of a location verifier 200 that could be employed, for example, as the location verifier 8 illustrated in FIG. 1. The location verifier 200 can include a memory 202 that can store machine readable instructions. The memory 202 could be implemented, for example, as non-transitory computer readable media, such as volatile memory (e.g., random access memory), nonvolatile memory (e.g., a hard disk drive, a solid state drive, flash memory, etc.) or a combination thereof. The location verifier 200 can also include a processing unit 204 to access the memory 202 and execute the machine-readable instructions. The processing unit 204 can include, for example, one or more processor cores. The location verifier 200 can include a network interface 206 configured to communicate with a network 208. The network interface 206 could be implemented, for example, as a network interface card. The network 208 could be implemented for example, as a public network (e.g., the Internet), a private network (e.g., a carrier network) or combination thereof (e.g., a virtual private network).

The location verifier 200 could be implemented, for example in a computing cloud. In such a situation, features of the location verifier 200, such as the processing unit 204, the network interface 206, and the memory 202 could be representative of a single instance of hardware or multiple instances of hardware with applications executing across the multiple of instances (e.g., distributed) of hardware (e.g., computers, routers, memory, processors, or a combination thereof). Alternatively, the location verifier 200 could be implemented on a single dedicated server.

The location verifier 200 can include a target identifier 210 that can send and receive network messages via the network interface 206. The target identifier 210 can receive a location report from a target device. In some situations, the location report can be provided voluntarily and/or in a periodic manner (e.g., a push operation). The location report can include, for example, the location of the target device at a given instance of time, as well as a unique identifier (e.g., an IP address, a MAC address, an MSID, a Bluetooth identifier, etc.) for the target device.

In other examples, the location report can be provided to the target identifier 210 in response to a location request. For instance, in some examples, the target identifier 210 can receive incoming network messages implemented as a location request for the target device (e.g., the target device 4 illustrated in FIG. 1). The location request could be provided, for example, from an enterprise server or another application executing on the location verifier. The location request can include, for example, information that uniquely identifies the mobile device (e.g., a telephone number, a network address, an MSID, an IMSI, etc.). In response to the location request, the target identifier 210 can provide a remote location request to the target device via the network interface 206. Additionally or alternatively, the target identifier 210 can also receive a list of devices that are detected through RF signals at the target device. In such a situation, the target identifier 210 can determine an RF fingerprint for the target device.

In any of the noted situations, the target identifier 210 can receive the location report from the target device via the network 208. The target identifier 210 can provide the location report to a PES interface 212. The PES interface 212 can be configured to communicate with a PES, such as the PES 12 illustrated in FIG. 1 via the network 208. Moreover, as explained with respect to FIGS. 2-5, the PES can be implemented as a GeoNexus service. Thus, the PES interface 212 can be configured to interface with the GeoNexus service in these situations. In other examples, the PES can be implemented as an HLR, a cellular broadcast system, etc. The PES interface 212 can provide a query (e.g., a proximity query) to the PES in the form explained herein. As explained herein, the query to the PES can include a maximum count, a reference point, a distance from the reference point, a mandatory required "collection" of attributes, an optional desired collection of attributes, and a collection of devices to be excluded from the response. In response, the PES can return a list of mobile devices to the PES interface 212. Each mobile device in the list of mobile devices that are each less than or equal to the distance from the reference point and includes the stipulated (e.g., required) attributes and does not include any device listed in the exclusion list.

The list of mobile devices can be provided from the PES interface 212 to an associated device identifier 214. The associated device identifier 214 can be configured to check the list of mobile devices, near the target device, against known family and friends or trusted_circles (etc.) associated with a user of the target device. The associated device identifier 214 can be configured such that if each mobile device near the target device are part of family/friends/trusted_circles associated with the target device the associated device identifier may not alter or otherwise interrupt the interrogations and note that confidence in the results is reduced because of the small probability that a "group spoof" may have been instituted by the user of the target device.

The list of mobile devices can also be provided to a device interrogator 216. The device interrogator 216 can send an interrogation message to identified peer-to-peer capable mobile devices that are near enough to the target device, which can be implemented as the K number of reference devices 16 and/or the associated device 14 illustrated in FIG. 1. Interrogation messages and corresponding responses can be sent, for example, via SMS messages, MME messages, SIP messages, HTTP messages, TCP messages, or other protocol messaging, such as protocols defined by the SDRC. This interrogation can include a digital or machine-to-machine (M2M) interaction between the device interrogator 216 and each of the identified mobile devices near the target device (or some subset thereof). The interaction between the device interrogator 216 and each identified mobile device can depend on software running on each of the identified mobile devices that can receive and then reply to the interrogation.

The interrogation of the mobile devices can be implemented in a simple manner. The interrogation by the device interrogator 216 can request a reply with a list of all the peer-to-peer capable device identifiers that are detected at a given mobile device. The software running on the given mobile device being interrogated can run in the background of the operation system of the given mobile device and/or be integrated with the operating system of the given mobile device and need not notify a user given mobile device owner that interrogation is underway since the interrogation need to only ask for device identifiers without any additional information to qualify or personalize those devices, thereby making the interrogation anonymous. Additionally or alternatively, the device interrogator 216 can request that the reply from each of the mobile devices includes a location report characterizing a current location of each respective mobile device.

The detected device list of each of the interrogated mobile devices can be provided to a verification scorer 218. The verification scorer 218 can determine a confidence value that characterizes a confidence level in the location characterized in the location report provided by the target device. The verification scorer 218 can search each anonymous list of peer-to-peer device identifiers that the location verifier receives from interrogated devices for the peer-to-peer device identifier included in the target device's location report. The verification scorer 218 can be configured such that if the verification scorer 218 finds the peer-to-peer device identifier included in the target device's location report in all of the interrogated lists of peer-to-peer device identifiers and some of the devices near the target are not associated with the target then the verification scorer 218 can set the confidence of the location verification to VERY HIGH.

Additionally, the verification scorer 218 can be configured such that if the verification scorer 218 determines that the peer-to-peer device identifier included in the target's location report in a subset of the interrogated lists of peer-to-peer device identifiers and some of the devices that detected the target device are not associated with the target device then the verification scorer 218 can set the confidence of the location verification to HIGH. Additionally, the verification scorer 218 can be configured such that if the verification scorer 218 determines the peer-to-peer device identifier included in the target's location report in all of the interrogated lists of peer-to-peer device identifiers but all of the devices that detected the target are associated with the target then the confidence of the location verification can be set to HIGH.

Still further, the verification scorer 218 can be configured such that if the verification scorer 218 finds the peer-to-peer device identifier included in the target device's location report in some of the interrogated lists of peer-to-peer device identifiers but all of the devices that detected the target are associated with the target then the confidence of the location verification can be set to MEDIUM. Yet further still, the verification scorer 218 can be configured such that if only one of the interrogated devices detected the target and that the interrogated device is not associated with the target then the confidence of the location verification can be set to MEDIUM. Yet further, the verification scorer 218 can be configured such that if only one of the interrogated devices detected the target device and that the interrogated device is associated with the target device then the confidence of the location verification can be set to LOW. The verification scorer 218 can also be configured such that if none of the interrogated devices detected the target then the confidence of the location verification can be set to VERY LOW. In some examples, the confidence value for the target device can be output to another system/application. In other examples, the confidence value can be output to a user of the location verifier 200 via a graphical user interface (GUI).

In some examples, the verification scorer 218 can employ the location report from each interrogated device, along with the list of devices in the detected device list to determine an RF fingerprint for each interrogated device. The verification scorer 218 can compare the RF fingerprint for each interrogated device to the RF fingerprint for the target device. In such a situation, similarities and differences in the RF fingerprints can be employed by the location verifier 218 to further increase or further decrease the confidence (e.g., trustworthiness) of the location characterized in the location report provided by the target device.

By employing the location verifier 200, the degree of confidence (e.g., trustworthiness) that the location characterized in the location report provided by the target device can be determined. Moreover, by employing peer-to-peer technologies (e.g., Bluetooth, WiFi, PROSE, etc.), the confidence value can be determined without querying a subscription based system, such as a carrier network.

Figure 7:
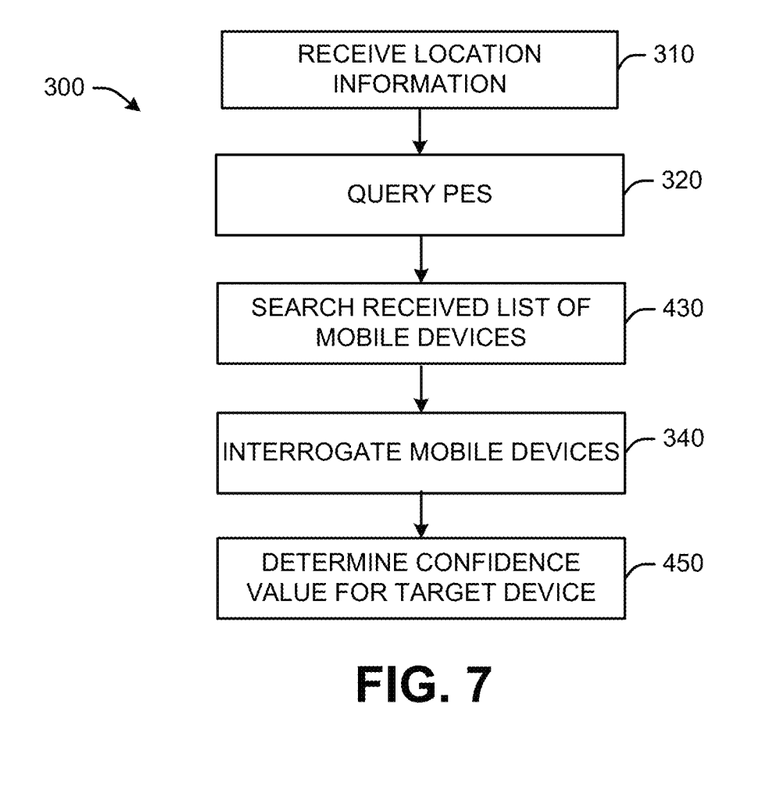
FIG. 7 illustrates a flowchart that depicts an example method of verifying the location of a target device.

In view of the foregoing structural and functional features described above, example methods will be better appreciated with reference to FIG. 7. While, for purposes of simplicity of explanation, the example method of FIG. 7 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method. The example method of FIG. 7 can be implemented as instructions stored in a non-transitory machine-readable medium. The instructions can be accessed by a processing resource (e.g., one or more processor cores) and executed to perform the methods disclosed herein.

FIG. 7 illustrates an example flowchart of a method 300 for verifying a location report provided from a target device. The method 300 could be implemented, for example, by the system 2 illustrated in FIG. 1 and/or the location verifier 200 illustrated in FIG. 2. At 310, the location report of the target device can be received, for example, at a target identifier of the location verifier. In some examples, the location report can be provided in response to a location request issued to an agent executing on the target device. In other examples, the location report can be sent (e.g., periodically) to the location verifier.

At 320, a PES can be queried by a PES interface of the location verifier for a list of mobile devices that are within a predefined proximity of the target device. The query can include, for example, a feature, such as Bluetooth, included in each mobile device in the list of mobile devices. The PES can process the request, and return the list of mobile devices in a manner described herein. At 330, the received list of mobile devices can be searched by an associated device identifier of the location verifier to determine if any of the mobile devices in the list of mobile devices are associated with the target device.

At 340, each of the mobile devices in the list of mobile devices can be interrogated by a device interrogator of the location verifier for a list of mobile devices that are detected through a peer-to-peer mechanism (e.g., Bluetooth, WiFi, PROSE, etc.). At 350, a confidence value for the location report can be determined by a verification scorer of the location verifier. The confidence value can be based on the results of the list of mobile devices detected by each of the interrogated mobile devices. The confidence value can characterize a degree of likeliness that the location characterized in the location report provided by the target device is trustworthy and not a spoofed location.

In view of the foregoing structural and functional description, those skilled in the art will appreciate that portions of the systems and method disclosed herein may be embodied as a method, data processing system, or computer program product such as a non-transitory computer readable medium. Accordingly, these portions of the approach disclosed herein may take the form of an entirely hardware embodiment, an entirely software embodiment (e.g., in a non-transitory machine readable medium), or an embodiment combining software and hardware. Furthermore, portions of the systems and method disclosed herein may be a computer program product on a computer-usable storage medium having computer readable program code on the medium. Any suitable computer-readable medium may be utilized including, but not limited to, static and dynamic storage devices, hard disks, optical storage devices, and magnetic storage devices.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processors of a general purpose computer, special purpose computer, or other programmable data processing apparatus (or a combination of devices and circuits) to produce a machine, such that the instructions, which execute via the one or more processors, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

What have been described above are examples. It is, of course, not possible to describe every conceivable combination of structures, components, or methods, but one of ordinary skill in the art will recognize that many further combinations and permutations are possible. Accordingly, the invention is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A location verifier comprising one or more computers having machine readable instructions, the location verifier being configured to:
   receive a location report of a target mobile device, wherein the location report includes data characterizing a location for the target mobile device;
   receive a list of mobile devices that are within a predefined proximity of the target mobile device;
   interrogate each mobile device in the list of mobile devices for a list of detected devices, wherein each device in the list of detected devices is detected through radio frequency (RF) peer-to-peer communications; and
   determine a likelihood that the location for the target mobile device has been spoofed based on the interrogating.

2. The location verifier of claim 1, wherein the location verifier is further configured to search the list of mobile devices to identify a mobile device that is associated with the target mobile device.

3. The location verifier of claim 2, wherein the association is based on a connection in social media.

4. The location verifier of claim 1, wherein the location verifier is further configured to query a proximity evaluation service (PES) for the list of mobile devices.

5. The location verifier of claim 4, wherein the PES is implemented as a passive location system.

6. The location verifier of claim 4, wherein the PES is implemented as a home location register.

7. The location verifier of claim 4, wherein the PES is implemented as a cellular broadcast system.

8. The location verifier of claim 1, wherein each mobile device in the list of mobile devices is configured to detect the devices through Bluetooth protocol communications.

9. The location verifier of claim 1, wherein each mobile device in the list of mobile devices is configured to detect the devices through WiFi protocol communications.

10. The location verifier of claim 1, wherein each mobile device in the list of mobile devices is configured to detect the devices through communications made via the prefix routing over set elements (PROSE) protocol.

11. The location verifier of claim 1, wherein the location verifier is configured to interrogate each of the mobile devices via a short message service (SMS) message.

12. The location verifier of claim 1, wherein the location verifier is configured to interrogate each of the mobile devices via the mobile management entity (MME) protocol.

13. The location verifier of claim 1, wherein the location verifier is configured to interrogate each of the mobile devices via the Session Initiation Protocol (SIP).

14. The location verifier of claim 1, wherein the location verifier is configured to interrogate each of the mobile devices via the Hypertext Transfer Protocol (HTTP).

15. The location verifier of claim 1, wherein the location verifier is configured to interrogate each of the mobile devices via the Transmission Control Protocol (TCP).

16. The location verifier of claim 1, wherein the determining further comprises:
searching the list of mobile devices to identify a set of mobile devices that are associated with the target device; and
increasing the likelihood that the location for the target mobile device has been spoofed in response to determining that the set of mobile devices that are associated with the target device are the only mobile devices in the list of mobile devices that detect the target mobile device through RF peer-to-peer communication.

17. The location verifier of claim 1, wherein the location verifier is further configured to:
determine a number of matches between a unique identifier of the target mobile device and unique identifiers included in each of the list of detected devices provided from each of the mobile devices that are within the predefined proximity of the target mobile device, wherein the likelihood that the location of the target mobile device has been spoofed is based on the determined number of matches.

18. A system comprising:
a memory configured to store machine readable instructions; and
a processing unit configured to access the memory and execute the machine readable instructions, the machine readable instructions comprising:
a target identifier configured to receive a location report from a target device that characterizes a location for the target device;
a proximity evaluation system (PES) interface configured to query a PES for a list of mobile devices that are within a predefined proximity of the location characterized in the location report;
a device interrogator configured to interrogate each mobile device in the list of mobile devices for other devices that are detected via a specified radio frequency (RF) based peer-to-peer protocol; and
a verification scorer configured to determine a confidence value for the location characterized in the location report based on the other devices detected by each interrogated mobile device, wherein the confidence value indicates a likelihood that the location for the target device has been spoofed.

19. The system of claim 18, wherein the query includes data characterizing the specified RF based peer-to-peer communication protocol employed by each mobile device in the list of mobile devices.

20. A system comprising:
a memory configured to store machine readable instructions; and
a processing unit configured to access the memory and execute the machine readable instructions, the machine readable instructions comprising:
a target identifier configured to receive a location report from a target device that characterizes a location for the target device; and
a proximity evaluation system (PES) interface configured to query a PES for a list of mobile devices that are within a predefined proximity of the location characterized in the location report, wherein the query includes data specifying a peer-to-peer communication protocol employed by each mobile device in the list of mobile devices;
a device interrogator configured to interrogate each mobile device in the list of mobile devices for other devices that are detected via the specified peer-to-peer protocol;
wherein the target identifier is further configured to:
receive a list of other devices that are detected by the target device at the location characterized in the location report; and
determine a radio frequency (RF) fingerprint for the target device based on the location report provided from the target device and the list of other devices detected by the target device;
wherein the device interrogator is further configured to interrogate each mobile device in the list of mobile devices for a location report that characterizes a current location of a respective mobile device in the list mobile devices;
wherein the verification scorer is further configured to:
determine an RF fingerprint for each mobile device in the list of mobile devices based on the other devices that are detected at each respective mobile device and on the location report provided by each respective mobile device; and
compare the RF fingerprint of the target device to the RF fingerprint of each of the mobile devices in the list of mobile devices.

21. The system of claim 20, wherein the confidence value determined by the verification scorer is also based on the comparison of the RF fingerprint for the target device to the RF fingerprint of each of the mobile devices in the list of mobile devices.

22. A method comprising:
querying, by a location verifier comprising one or more computing devices, a proximity evaluation system (PES) for a list of mobile devices that are within a predefined distance of a location characterized in a location report received from a target mobile device;
interrogating, by the location verifier, each of the mobile devices in the list of mobile devices for devices that are detected through a peer-to-peer communication protocol; and
determining, by the location verifier, a trustworthiness of the location characterized in the location report from the target mobile device based on the interrogating, wherein the trustworthiness corresponds to a likelihood that the location characterized in the location report provided from the target mobile device has been spoofed.

23. The method of claim 22, wherein the determining further comprises searching the list of mobile devices for a mobile device that is associated with the target mobile device.

\* \* \* \* \*